Feb. 19, 1946.    E. V. CRANE ET AL    2,395,169
CLAMPING HUB
Filed March 18, 1944
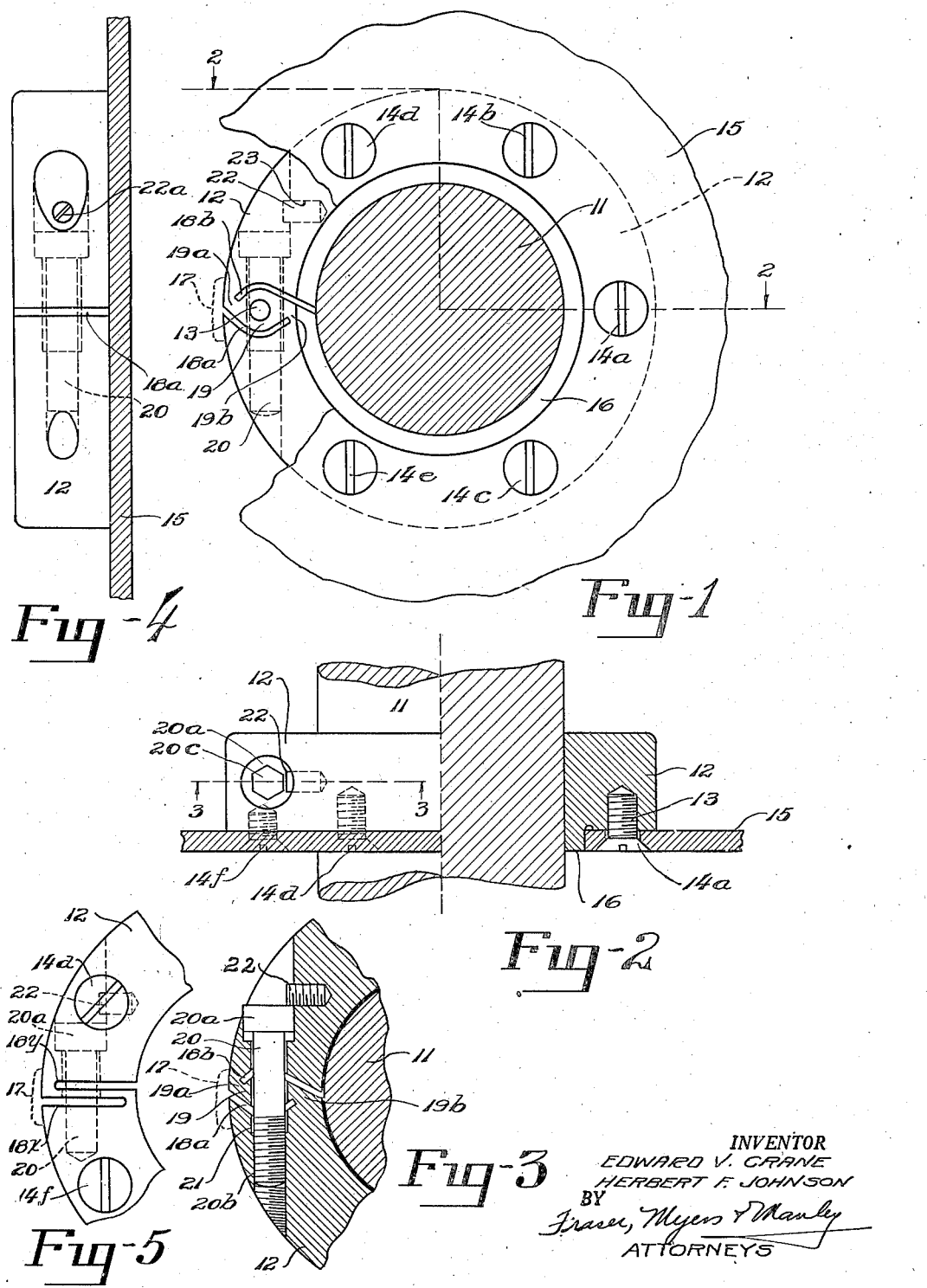
INVENTOR
EDWARD V. CRANE
HERBERT F. JOHNSON
BY
Fraser, Myers & Manley
ATTORNEYS Patented Feb. 19, 1946

2,395,169

UNITED STATES PATENT OFFICE 2,395,169

CLAMPING HUB

Edward V. Crane, Brooklyn, and Herbert F. Johnson, Baldwin, N. Y., assignors to E. W. Bliss Company, Brooklyn, N. Y., a corporation of Delaware Application March 18, 1944, Serial No. 527,382

15 Claims. (Cl. 287—52)

The present invention relates to improvements in hubs upon which may be mounted circular mechanical elements or tools such as wheels, circular cutters, and the like. It relates, more particularly, to hubs adapted to be clamped firmly against angular or axial displacement on a smooth-surfaced spindle or shaft.

It is often desirable, in various types of machines, to mount one or more wheels or other circular rotating elements, such as circular cutters, upon a shaft which may have a relatively smooth surface and in which, for reasons of stiffness, strength, straightness or safety, no keyways, splines or other irregularities are present to aid in fixing such a circular element or elements on the shaft. Under such conditions it is important that substantially the entire inner surface of the hub of such element grip the shaft firmly to avoid displacement of the hub either axially or circumferentially with respect to the shaft.

In order to obtain this complete gripping effect, at least two conditions should be fulfilled: (1) the contraction of the hub should be effective substantially evenly about the entire circumference of the hub, as otherwise the firm engagement of the hub with the shaft may be localized at two or a few spots about the hub; and (2) all parts of the hub should be maintained in substantially perfect circumferential alignment in which the central circumferential line of the hub extends therearound in a single plane. Circumferential malalignment, a condition wherein the said line extends somewhat spirally around a shaft in contrast to the mentioned single plane extension, may result in imperfect gripping at various axial points along the inner surface of the hub and may cause imperfect functioning of the rotating element, individually, and of the functioning of the rotating element in relation to other rotating elements mounted upon the same shaft.

One example of the importance of maintaining such circumferential alignment is evident in so-called "gang slitters," comprising several circular cutters, all mounted on a common shaft, in can-making machinery, for cutting sheet metal into strips for use in making can bodies. Obviously, in such structures, it is important to effect a straight cut in the sheet metal and the several circular cutters would not function together properly to yield that result unless substantially perfect circumferential and axial alignment is maintained in each cutter.

An important object of the invention is the provision of a clamping hub in which the contraction thereof is effective substantially evenly over its entire circumference causing the hub, when contracted, to grip the shaft firmly at all points therearound and thus to aid materially in yielding a rigid mounting of the hub upon the shaft.

Another important object is the provision of a clamping hub in which the contraction and expansion thereof may be effected while assuring that circumferential alignment is maintained at all times.

Still another important object of the invention is the provision of a clamping hub having means for positively expanding and contracting it to cause it to grip or be freed readily with respect to a smooth shaft upon which it may be mounted.

The foregoing and other objects are accomplished according to the present invention by providing in a clamping hub, a portion which is circumferentially collapsible at both the inner and outer circumferential parts thereof. The said portion, which, at both sides thereof, is integral with the body of the hub to maintain circumferential alignment, includes adjacent opposed slots, one extending outwardly from the inner circumference of the hub and the other extending inwardly from the outer circumference thereof. A screw is arranged so that it extends tangentially of the hub, through the said collapsible portion, with its head and its threaded portion coacting with the hub body at opposite sides of the collapsible portion, to collapse the latter and thus contract the hub body into firm and complete engagement with the shaft. A stop, in the form of a plug or stud, is arranged to block the path of the head of the screw as the latter is loosened so that the screw functions, also, to expand the hub body positively, to free it from the shaft.

The invention may be understood from the accompanying drawing, in which:

Figure 1 is a side elevational view of a preferred embodiment of a clamping hub according to the present invention, including also a portion of a circular element which may be considered as a circular knife or cutter, the latter being partly broken away to show a detail of the hub;

Fig. 2 is a view, partly in elevation and partly in section, taken on the irregular line 2—2 of Fig. 1;

Fig. 3 is a detail, in section, taken on the line 3—3 of Fig. 2;

Fig. 4 is an elevational view of the hub as seen from the left of Fig. 1; and

Fig. 5 is a fragmentary view, similar to a portion of Fig. 1, illustrating another of various possible other embodiments of the present invention.

The illustrated preferred embodiment, shown as mounted upon a shaft 11, comprises an annular hub body 12, having therein a plurality of relatively shallow tapped holes 13, preferably symmetrically arranged about the said body, and adapted to receive plural machine bolts 14a, b, c, d, e, f for securing a cutter 15 or other circular element thereto, in a well understood manner. The hub body 12 may be formed with an annular flange 16 which may extend axially of the inner circumferential portion of the hub body to the extent of the thickness of the cutter 15, thus enlarging, somewhat, the inner hub surface which grips the shaft.

The structure of the hub body 12 which renders it expansible and contractile comprises a portion 17 of the hub body which is rendered collapsible, substantially throughout its entire radial section, circumferentially of the hub body 12, by the formation of slots 18a and 18b each extending throughout the entire axial length of the hub body 12, including the flange 16; the slot 18a extending from the outer circumference of the body 12 to a point near the inner circumference thereof and adjacent the slot 18b, and the latter slot extending from the inner circumference of the body 12 to a point near the outer circumference thereof and adjacent the slot 18a. In the preferred embodiment, as illustrated, the slots 18a and 18b are curved and partially encircle one of the tapped holes 13.

It will be perceived that the described slot arrangement leaves a connecting portion 19, which connects the outer circumferential portion of the hub body 12, at one side of the collapsible portion 17, with the inner circumferential portion of the hub body, at the other side of the collapsible portion 17. An outer web 19a and inner web 19b of the connecting portion 19 are both sufficiently narrow and the hub body 12 is of such material that when force is applied, as hereinafter explained, the webs 19a and 19b may bend or become somewhat distorted about lines parallel to the axis of the shaft 11, to permit the hub body 12, as a whole, to expand and contract.

The webs 19a and 19b, however, are of such substantial dimensions along lines parallel to the axis of the shaft 11 (being as long, in that dimension, as the entire axial thickness of the hub body 12) that while the hub body 12 may contract and expand, the connecting portion 19 affords a positive restriction against any resulting circumferential disalignment of the portions of the hub body 12, at opposite sides of the collapsible portion 17.

The means for forcibly contracting the hub body 12, preferably comprise a headed locking screw 20 which is adapted to be inserted from the exterior of the hub into a tangential bore 21 extending through the collapsible portion 17. The bore 21, as best seen in Fig. 3, is enlarged at one end to accommodate the head 20a of the locking screw, and is internally threaded at its opposite end to receive the threaded end 20b of said screw. The diameter of the intermediate portion of the bore 21 is sufficiently greater than the diameter of the threaded portion 20b of the screw that when the latter is inserted into said bore, the said threaded portion may slide freely through said intermediate portion of the bore into position to coact with the internally threaded end of the bore. The head 20a may be provided with a socket or recess 20c, preferably of polygonal design, to receive a complementally shaped socket wrench to tighten and loosen the screw 20.

The inside of the hub body 12, made for any given shaft size, is of such a normal size, slightly greater than the shaft, that it may slide freely along the latter to its desired position thereon after which the locking screw may be screwed tightly into the bore 21, causing the portion 17 of the hub to collapse somewhat to effect contraction of the hub as a whole thus deriving a firm grip of the hub upon the shaft.

The extent of the collapse of the portion 17 and the consequent contraction of the hub, is limited according to the width of the cuts forming the slots 18a and 18b. It may be seen from Fig. 3 that the mentioned collapse of the portion 17 is enhanced and made to occur, in effect, throughout its entire radial section because of the arrangement by which the closed inner end of slot 18a is separted from an adjacent portion of the slot 18b by the relatively thin web 19a, and by which the closed outer end of slot 18b is separated from an adjacent portion of the slot 18a by a relatively thin web 19b. These webs, while of ample strength to prevent circumferential disalignment of the hub body, nevertheless may bend slightly when the locking screw 20 is tightened, to permit the slots 18a and 18b to partially close to yield the desired contraction of the hub.

It may be observed that the tightening of the screw 20 may induce, as an incident of the collapsing of the portion 17, a slight rotation of the connecting portion 19 about a central axis thereof which is substantially parallel to the axis of the shaft, therefore, the diameter of the bore 21, within the connecting portion 19, preferably should afford sufficient clearance that the locking screw 20 may not inhibit such rotation.

The substantially perfect and complete engagement of the inside of the hub with the shaft, together with a setting of the hub material at portion 19 and webs 19a and 19b, may render it difficult if not impossible to free the hub from the shaft merely by loosening the locking screw 20. Where this difficulty has been experienced with other hub structures, it has been the practice to strike the hub a sharp blow or blows with a hammer to free it from the shaft, thus inducing detrimental disalignment of the hub and sometimes damaging the shaft, to some extent.

In order to obviate the detriments mentioned in the next preceding paragraph, the present invention includes unlocking means for positively expanding the hub when it is desired to move it along or remove it from the shaft. The said unlocking means preferably comprises a stop member which may be in the form of a plug 22 adapted to be retained within a bore 23 drilled or otherwise formed in the hub body 12, extending laterally from the inner side of the enlarged end of the bore 21. The plug 22 and the bore 23 may be complementally threaded and the outer end of the plug may be slotted as at 22a or otherwise recessed to receive a screwdriver or socket wrench to drive said plug firmly into place. As is evident from Fig. 4, the slot 22a is easily accessible for this operation.

In assembling the hub, the plug 22 is inserted in place after the locking screw 20 has been inserted and at least partially screwed into the bore 21, and, further, as best seen in Figs. 1 and 3, the plug 22 is in such position that upon loosening and continuing to unscrew the locking screw 20, the protruding outer end of the plug 22 engages the top of the head of the locking screw 20 and the latter, still coacting at one end with the threaded portion of the bore 21 and coacting at its other end with the said plug, forcibly expands the hub body 12 whereby to free it from the shaft 11. This of course occurs conveniently, as a result of merely continuing the operation required in any event to loosen the locking screw 20, and it also occurs without any detrimental effect inasmuch as hammering of the hub is unnecessary.

The embodiment illustrated in Fig. 5, differs from the preferred embodiment chiefly in that straight slots 18x and 18y are employed instead of the curved slots 18a and 18b. In this embodiment, the collapsible portion 17 may be located between bolts 14d and 14f instead of being localized at one of such bolts.

It will be seen from the present description and the accompanying drawing that a hub according to the present invention yields a practically perfect gripping upon the shaft and assurance of proper circumferential alignment, and includes means for positively freeing the hub from the shaft to avoid hammering or other objectionable practice which might cause disalignment.

It should also be apparent that the inventive concept disclosed herein may be utilized in various other embodiments within the invention as defined in the accompanying claims.

What we claim is:

1. A clamping hub comprising a hub body having a circumferentially collapsible portion integral therewith, rendering the hub body substantially continuous and adapting the hub body for expansion and contraction.

2. A clamping hub comprising a contractile annular hub body having an unbroken portion circumferentially collapsible substantially throughout the entire radial section thereof and being integral at opposite sides thereof with the remainder of said body whereby to provide for contraction of the body while restraining the latter against axial distortion.

3. A clamping hub comprising an expansible and contractible annular hub body having an unbroken circumferentially distortable portion, integral, at opposite sides thereof, with the remainder of said body, and adapted for distortion of a character which imparts to the remainder of the hub body no material distortion apart from that incident to expansion or contraction of said hub body, and means adapted to positively distort said distortable portion whereby to vary the circumference of said hub body.

4. A clamping hub comprising an annular hub body, capable of expansion and contraction, having an unbroken, circumferentially distortable portion integral at, opposite sides thereof, with the remainder of the hub body, and a screw coacting with the latter at opposite sides of the said distortable portion to distort said distortable portion to expand and contract the hub body.

5. A clamping hub comprising a hub body having adjacent slots extending inwardly and outwardly substantially radially of said body and adapted to render hub portions adjacent said slots deformable to permit contraction of the hub body, and a headed screw in said hub body, extending through both said slots, and adapted to coact, at its head, with a portion of the hub body at one side of said slots, and at a threaded portion of the screw, remote from its head, with a portion of the hub body at the other side of said slots, whereby to positively contract the hub body.

6. A clamping hub according to claim 5, further characterized in that the said slots are arcuate and are arranged with their concave sides toward each other.

7. A clamping hub according to claim 5, further characterized in that the said slots are substantially straight and parallel relatively to each other.

8. A clamping hub according to claim 5, further characterized in having holes to receive bolts or the like for securing an element upon the hub, and in that the said slots, considered together, are disposed symmetrically relatively to said holes.

9. A clamping hub comprising an expansible hub body having adjacent slots extending inwardly and outwardly substantially radially of said body and adapted to render hub portions adjacent said slots deformable to permit expansion of the hub body, and a screw in said hub body, extending through both said slots, and adapted to coact, substantially at its opposite ends, with hub portions at opposite sides of the said slots, whereby to positively expand the hub body.

10. A clamping hub comprising a contractible and expansible hub body having a first slot extending outwardly from the interior of the hub body and a second slot, adjacent the first slot, extending inwardly from the exterior of the hub body, deformable hub-body portions between the inner end of each slot and an adjacent portion of the other slot, and a locking screw extending through both said slots and having a threaded end threaded into the hub body at one side of said two slots, and its other end, with a head thereon, extending into a bore in the hub body at the other side of said two slots, the said bore having axially spaced screw-head engaging means therein, adapted to coact with opposite ends of said head to limit axial movement of the locking screw in either direction in the bore, whereby to render said hub positively contractible and expansible in response to turning of said locking screw.

11. A clamping hub comprising an expansible and contractible annular hub body, a first slot extending substantially radially outwardly from the interior of the hub body, a second slot extending substantially radially inwardly from the exterior of the hub body, both said slots extending throughout the entire axial length of the hub body and the inner ends of each of said slots being adjacent the other slot; deformable hub-body portions adjacent the inner ends of said slots, a connecting portion between said slots, constituting, with said deformable hub-body portions, a substantial connection between first and second opposed portions of the hub body at opposite sides of said two slots whereby to maintain circumferential alignment of said opposed portions; the hub body having a bore formed therein, extending substantially tangentially of the hub, through said opposed hub-body portions and through said slots and the connecting portion, the bore having a threaded portion in the said first opposed portion of the hub body and a shoulder in the said second opposed portion; and a locking screw having a threaded end adapted to coact with the threaded portion in said bore, and having a head adapted to coact with the said shoulder whereby, positively, to contract the hub.

12. A clamping hub comprising an expansible and contractible annular hub body, a first slot extending substantially radially outwardly from the interior of the hub body, a second slot extending substantially radially inwardly from the exterior of the hub body, both said slots extending throughout the entire axial length of the hub body and the inner ends of each of said slots being adjacent the other slot; deformable hub-body portions adjacent the inner ends of said slots, a connecting portion between said slots, constituting, with said deformable hub-body portions, a substantial connection between first and second opposed portions of the hub body at opposite sides of said two slots whereby to maintain circumferential alignment of said opposed portions; the hub body having a bore formed therein, extending substantially tangentially of the hub, through said opposed hub-body portions and through said slots and the connecting portion, the bore having a threaded portion in the said first opposed portion of the hub body and a protuberance in the said second opposed portion; and a locking screw having a threaded end adapted to coact with the threaded portion in said bore, and being adapted, at its other end, to coact with the said protuberance whereby, positively, to expand the hub.

13. A clamping hub comprising an expansible and contractible annular hub body, a first slot extending substantially radially outwardly from the interior of the hub body, a second slot extending substantially radially inwardly from the exterior of the hub body, both said slots extending throughout the entire axial length of the hub body and the inner ends of each of said slots being adjacent the other slot; deformable hub-body portions adjacent the inner ends of said slots, a connecting portion between said slots, constituting, with said deformable hub-body portions, a substantial connection between first and second opposed portions of the hub body at opposite sides of said two slots whereby to maintain circumferential alignment of said opposed portions; the hub body having a bore formed therein, extending substantially tangentially of the hub, through said opposed hub-body portions and through said slots and the connecting portion, the bore having a threaded portion in the said first opposed portion of the hub body, a shoulder in the said second opposed portion, and a protuberance in the said second opposed portion, spaced from said shoulder; and a locking screw having a threaded end adapted to coact with the threaded portion in said bore, and a head, one portion of which is adapted to coact with said shoulder to contract the hub body, and another portion of which is adapted to coact with the said protuberance to expand the hub body.

14. In a clamping hub having opposed portions adapted to be moved relatively to each other, circumferentially, to contract or expand the hub; expanding and contracting means comprising a locking screw, extending tangentially of the hub, and having a threaded portion toward one end coacting with one of said opposed hub portions and a head toward its other end coacting with the other of said opposed hub portions, the latter hub portion having means coacting with said head for restricting longitudinal movement of the locking screw in both of opposite directions relatively to the said latter hub portion, whereby rotation of the locking screw in one direction causes positive contraction of the hub and rotation of said screw in the opposite direction causes positive expansion of the hub.

15. In a clamping hub, expanding and contracting means according to clamp 14, further characterized in that the means for restricting the mentioned longitudinal movement of the locking screw comprises a shoulder adapted to engage the under side of the head of said screw to limit such longitudinal movement of the screw in one direction, and a plug extending into the path of movement of the screw and adapted to engage the top of the head of said screw to limit such longitudinal movement of the screw in the opposite direction.

EDWARD V. CRANE.
HERBERT F. JOHNSON.